(12) United States Patent
Mentzer

(10) Patent No.: US 7,724,284 B2
(45) Date of Patent: May 25, 2010

(54) MULTI-CAMERA SYSTEM AND METHOD HAVING A COMMON PROCESSING BLOCK

(75) Inventor: Ray A. Mentzer, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 795 days.

(21) Appl. No.: 11/238,461

(22) Filed: Sep. 29, 2005

(65) Prior Publication Data

US 2007/0070204 A1    Mar. 29, 2007

(51) Int. Cl.
*H04N 5/232* (2006.01)
*H04N 13/02* (2006.01)
*H04N 9/04* (2006.01)
*H04N 5/225* (2006.01)
*G03B 35/00* (2006.01)

(52) U.S. Cl. .................. 348/211.11; 348/47; 348/262; 348/207.99; 396/325

(58) Field of Classification Search .............. 348/42.43, 348/46, 47, 48, 51, 53, 153, 159; 396/322, 396/324, 325, 332, 333, 334, 335, 336
See application file for complete search history.

(56) References Cited

U.S. PATENT DOCUMENTS 7,139,473 B2 * 11/2006 Shimano et al. ............... 396/73

2002/0108011 A1 * 8/2002 Tanha ......................... 710/306
2003/0223001 A1 * 12/2003 Maeda et al. ................ 348/273
2005/0237424 A1 * 10/2005 Weekamp et al. ........... 348/373

FOREIGN PATENT DOCUMENTS

EP           1420568  A1 *  5/2004
WO       WO 0131893  A1 *  5/2001

* cited by examiner

*Primary Examiner*—David L Ometz
*Assistant Examiner*—Peter Chon
(74) *Attorney, Agent, or Firm*—RatnerPrestia

(57) ABSTRACT

A system and method for realizing a multi-camera system having two optical paths with a single processing path for the two optical paths. Such a multi-camera system typically includes a first image-capture device associated with a first optical train wherein the first image-capture device is typically pointed in a first direction (i.e., away from the user). The multi-camera system further includes a second image-capture device having a second optical train wherein the second image-capture device is typically pointed in a second direction (i.e., toward the user). The multi-camera system further includes a single processing block coupled to the first image-capture device and the second image-capture device. The processing block is typically operable to process image data captured at each image-capture device.

6 Claims, 3 Drawing Sheets

MULTI-CAMERA SYSTEM AND METHOD HAVING A COMMON PROCESSING BLOCK

BACKGROUND OF THE INVENTION

Digital cameras and digital video cameras are becoming more prevalent in various electronic devices of today's electronics. It is common for cameras to be included in mobile phones, handheld devices, and portable/laptop computers. Because such digital cameras and digital video cameras are becoming cheaper to manufacture and are being realized in smaller packages, the demand for devices to include such cameras is increasing. As a result, more and more functionality for these cameras system is also being demanded.

For example, cameras that are mounted to laptop computers, mobile phones and the like have typically been mounted in a fixed position such that any focal path of an optical train associated with the camera system was set relative to the device. That is, to point the camera in a different direction, the entire device needs to be maneuvered. Thus, a laptop computer having a camera pointing straight out of the view screen would require a user to point the view screen at whatever the user wishes to capture as a picture or video. This has been a problem of the past in that a user, by pointing the camera at the subject (and consequently pointing the view screen as well because of the fixed position of the camera), can now no longer see the view screen to properly align/adjust a capture area since the view screen is now pointing away from the user along with the camera.

One conventional solution to having a fixed position camera in various devices has been to mount the camera system in a maneuverable harness such that the focal path of the camera may be rotated in various directions without moving the rest of the device. Thus, a laptop computer screen may include a swivel-mounted camera at the top of the view screen that may be rotated as much as 180 degrees backwards to capture images on the opposite side of the view screen.

Such maneuverable cameras solved the problem of not being able to see the view screen when taking pictures or capturing video, but introduced several new problems. Such new problems include typical problems always associated with maneuverable devices requiring electronic connections inside the maneuverable part, such as flexible wiring and connection points. These flexible wiring accommodations are not only more expensive, but are far more prone to fail with far less use. Thus, even though maneuverable camera systems solved the original problem, the implementation and application left a lot to be desired.

In another conventional solution, a device requiring more than a focal path for a camera in an opposite direction of a view screen may be manufactured to have the camera system simply mounted to face the opposite direction. This solution, however, then restricted the camera use to subjects on the opposite side of the view screen. Thus, in applications where the camera should point in the same direction as the view screen, such as a video conferencing situation, then the user could not simultaneously be captured by the camera and also view a feed on the view screen from somewhere else.

In response to this, some device manufacturers have designed devices having two separate camera systems: one for a direction which points the same direction as the view screen and one that points in the opposite direction away from the view screen. For example, FIG. 1 shows a block diagram of a conventional camera system 100 having two distinct cameras that are pointed in opposite or relatively opposite optical directions. Generally speaking, conventional camera systems having two cameras employ two separate camera blocks. As can be seen the conventional multi-camera system 100 of FIG. 1, a first camera block 101 includes a first optical train 105 situated to focus incident light upon a first sensor 110. The first sensor 110 typically includes a first pixel array 111 for capturing incident light in a known pixel-by-pixel manner. The optical information may then be sent to a processing block 130 for processing and storage.

Similarly, a second camera block 151 is also included in the conventional multi-camera system 100. The second camera block 151 also includes an optical train 155, a sensor 150, a pixel array 151 and a processing block 180 that operate in conjunction with other similar to the first camera block 101 described above. However, the first camera block 101 and the second camera block 151 are autonomous and do not in any manner interact with each other. In this sense, each camera block 101 and 151 is independent and typically disposed on separate integrated circuits (ICs) or separate electronic circuit boards (ECBs). As such, despite having two cameras in the multi-camera system 100 (which may be coupled to an overall system processor (not shown) for manipulation and control) each one requires a specific amount of space, power, and cost in the overall system 100 implementation. Thus, in most cases having two cameras in the multi-camera system 100 results in twice the cost, twice the implementation space and twice the power requirements over a system with only one camera.

While this solution addresses the problems discussed above, the space requirements, power consumption, and manufacturing costs are typically more than doubled to accommodate the two-camera solution. Having two distinct and separate camera systems is a bulky inefficient and wasteful solution to the problems presented above.

SUMMARY OF THE INVENTION

An embodiment of the invention is directed to a multi-camera system having two optical paths with a single processing path for the two optical paths. Such a multi-camera system typically includes a first image-capture device associated with a first optical train wherein the first image-capture device is typically pointed in a first direction (i.e., away from the user). The multi-camera system further includes a second image-capture device having a second optical train wherein the second image-capture device is typically pointed in a second direction (i.e., toward the user). The multi-camera system further includes a single processing block coupled to the first image-capture device and the second image-capture device. The processing block is typically operable to process image data captured at each image-capture device.

With such a multi-camera system, two optical trains and feeding analog signals into a single processing block is a more efficient way of realizing a multi-camera system. Such a system saves implementation space with only having one processing block. Further, manufacturing costs are less with only one processing block as two distinct processing blocks are not required. Further yet operational power is minimized with only one processing block because only one processor is required. In short, realizing a multi-camera system wherein two separate sensors having respective optical trains feeding image data into one processing block is a more efficient solution than conventional multi-camera systems of the past.

Furthermore, the ability to process and capture the two sets of image data separately and differently is still maintained. Thus, the two optical path/sensor assemblies (i.e., cameras) may be designed for specific purposes, such as a first camera for high-resolution image capture and a second camera for low-resolution video conferencing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed above without departing from the spirit and scope of the present invention. The present invention is not intended to be limited to the embodiments shown, but is to be accorded the widest scope consistent with the principles and features disclosed or suggested herein.

Figure 1:
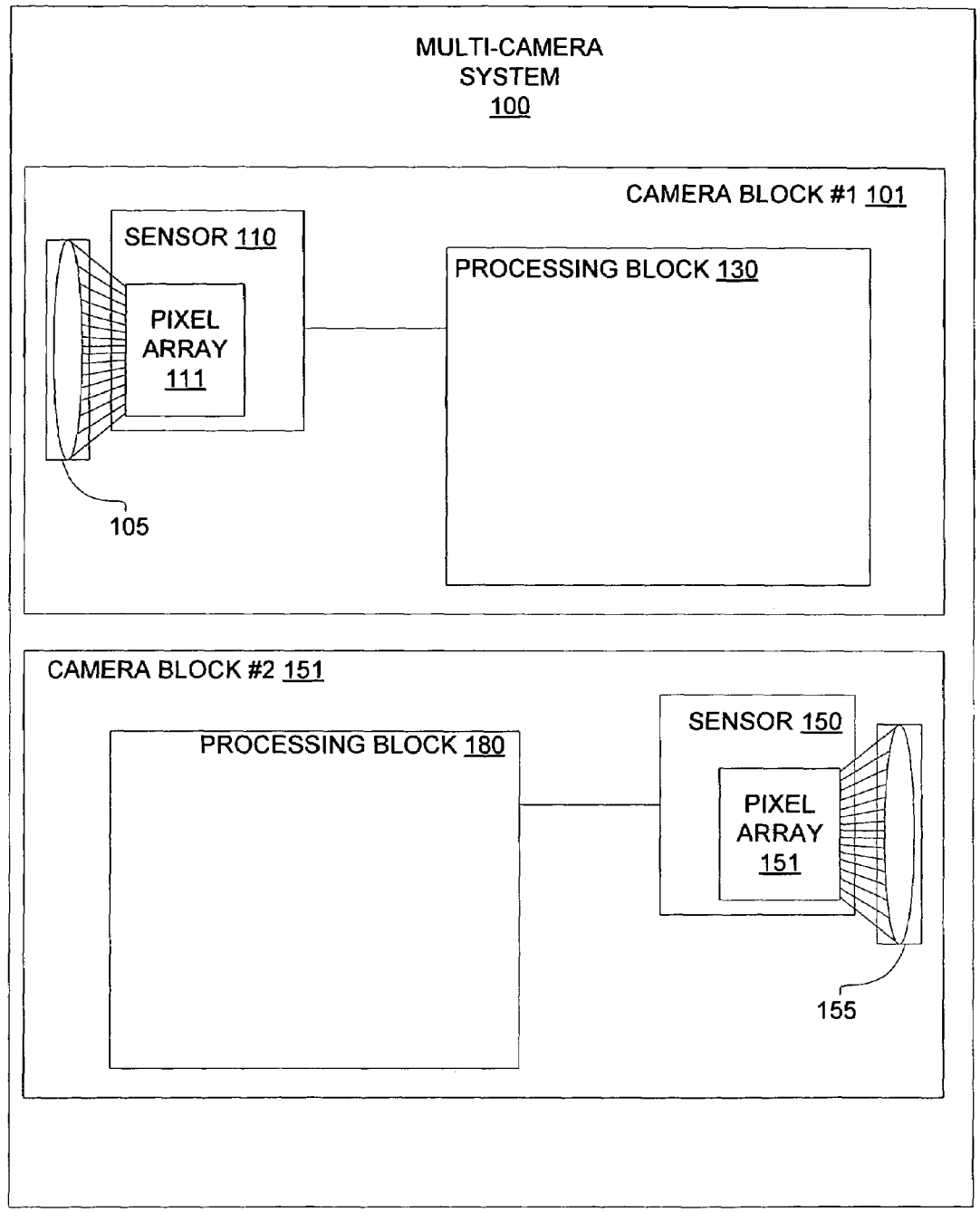
FIG. 1 is a block diagram of a conventional camera system having two distinct cameras that are pointed in opposite or relatively opposite optical directions.
Figure 2:
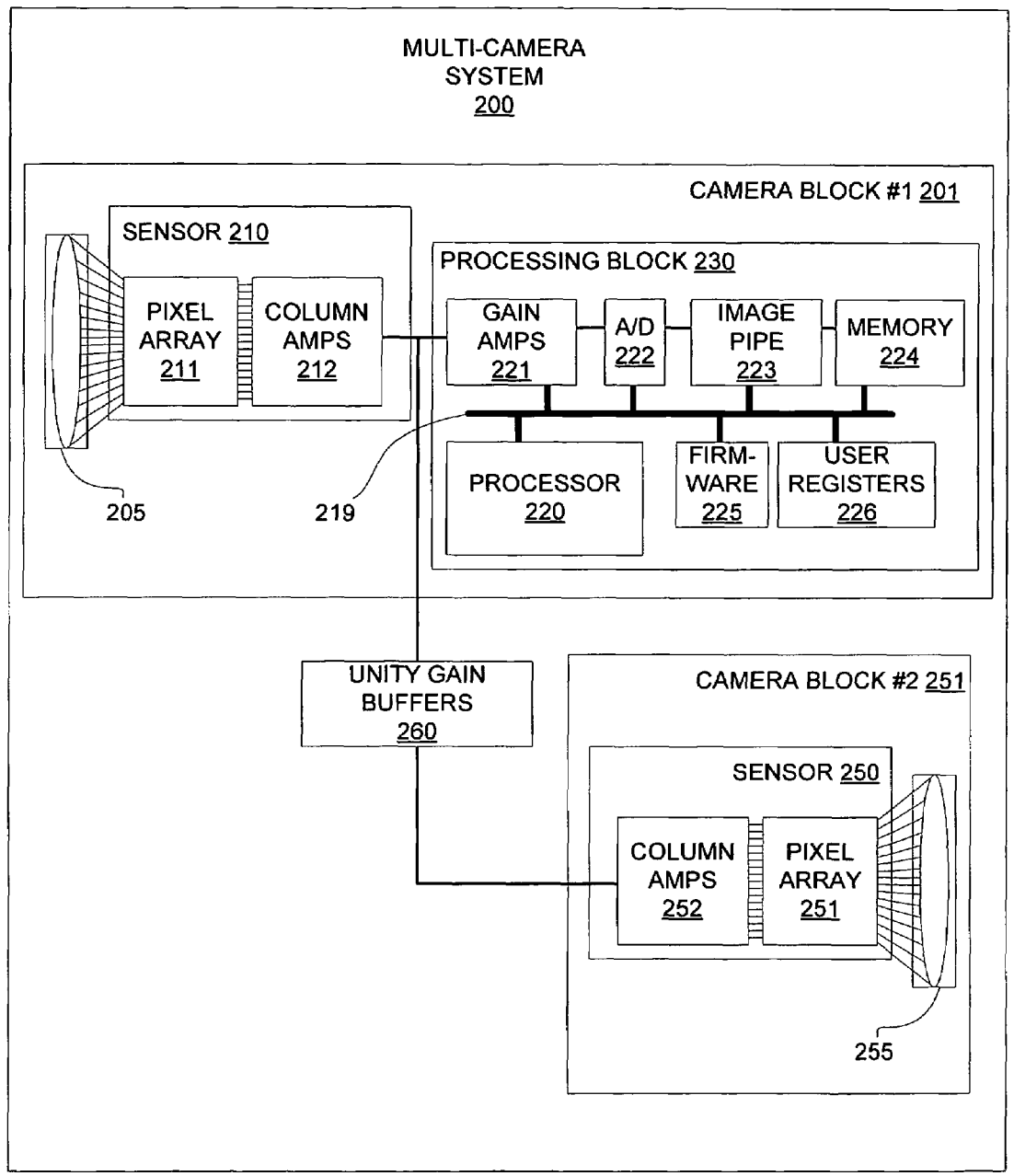
FIG. 2 is a block diagram of a multi-camera system having two optical trains pointed in different direction in accordance with an embodiment of the invention.

FIG. 2 is a block diagram of a multi-camera system 200 having two optical trains 205 and 255 pointed in different directions in accordance with an embodiment of the invention. In this embodiment, a first sensor 210 (associated with a first optical train 205) and a second sensor 250 (associated with a second optical train 255) are coupled to a processing block 230. The first sensor 210 and the processing block 230 may comprise a first camera block 201 while the second sensor 251 may be part of a second camera block 251. Although shown as separate camera blocks 201 and 251, the distinction is irrelevant and presented merely for the purposes of explanation and understanding.

The first sensor 210 typically includes a pixel array 211 situated to have incident light focused from the associated optical train 205. The pixel array 211 is further coupled to column amplifiers 212 for transducing the captured light into an analog signal for transmission to the processing block 230. The sensor 210 typically includes other circuitry but is not included or discussed herein for brevity. The optical train 205 is typically pointed in a first direction such that one of the above-described scenarios may be accomplished. That is, the first optical train 205 may be included in the system 200 to provide a camera pointing away from the user of a laptop or mobile phone. In this manner, the first optical train 205 (together with the first sensor 210) may be used as a camera for taking pictures, capturing video and other camera functions wherein the camera typically points away from the user.

The second sensor 250 also includes a pixel array 251 situated to have incident light focused from the second associated optical train 255. The pixel array 251 is further coupled to column amplifiers 252 for similarly transducing the captured light into an analog signal for transmission to the processing block 230. The second optical train 255 is typically pointed in a second direction such that one of the other above-described scenarios may be accomplished. That is, the second optical train 255 may be included in the system 200 to provide a camera pointing toward the user of a laptop or mobile phone. In this manner, the second optical train 255 (together with the second sensor 250) may be used as a camera for video conferencing, capturing a second video feed and other camera functions wherein the camera typically points toward the user.

Each sensor 210 and 250 is electronically coupled to the processing block 230 such that analog signals representing captured light images may be transmitted to the processing block 230. In order to maintain signal integrity, the second camera block 251 (i.e., the second sensor 250 and second optical train 251) typically utilizes a unity gain buffer 260 between the column amplifiers 252 and the processing block 230. As such, each sensor 210 and 250 may produce analog signals representing captured image data for processing to the processing block 230. Although shown as part of the first camera block 201, the processing block 230 may, in fact, be part of the other camera block 251 or its own separate block as the distinction in FIG. 2 is merely for illustrative purposes. Furthermore, the unity gain buffer 260 may be integrated with any block.

The processing block 230 typically includes a processor 220 and a bus 219. The processor 220 typically controls a number of additional components through communications over the bus 219. As such when an analog signal is first received at the processor from one of the sensors 210 or 250, the analog signal is routed through a set of gain amplifiers 221 for amplifying the analog signal to a suitable level for further processing. Then the analog signal is passed through an analog-to-digital converter 222 (A/D) where the analog signal is converted into a digital signal.

In its digital form, the signal may be further processed in several different known ways. For example, the entire digital image may be processed to balance light and/or balance color. Spurious signals may be smoothed and other picture effects may be added. These image processing steps are well known in the art and are generally represented in FIG. 2 as the image pipe 223. Thus, as the set of digital signals representing the image passes through the image pipe 223, the image or portion thereof, undergoes any number of desired processing steps before being stored in a memory 224.

To further assist and define various processing steps, the processing block 230 typically includes a set of user registers 226 for storing user-chosen parameters that may change by inputting values to the multi-camera system 200. Further, some processing may be implemented via firmware 225 as some steps may be processing intensive and not subject to user parameter changes. Typically, the firmware 225 is implemented to deal with processing parameters related to the size of each pixel array 211 and 251.

With such a multi-camera system 200 as depicted in FIG. 2, two optical trains 205 and 255 feeding analog signals into a single processing block 230 is an efficient way of realizing a multi-camera system 200. Such a system 200 saves implementation space with having only one processing block 230. Further, manufacturing costs are less with only one processing block 230 as two distinct processing blocks are not required. Further yet operational power is minimized with only one processing block 230 because only one processor 220 is required. In short, realizing a multi-camera system 200 wherein two separate sensors 210 and 250 having respective optical trains 205 and 255 feeding into one processing block 230 is a more efficient solution than conventional multi-camera systems of the past.

Several embodiments of the invention are contemplated wherein the two camera blocks 201 and 251 may be disposed on one or more ICs or ECBs. In one embodiment, the first camera block 201 is disposed on a single IC while the second camera block 251 is disposed on a separate IC. As such, the first and second ICs (not shown) may be situated such that the optical trains 205 and 255 disposed on each face opposite directions and the ICs themselves are "back-to-back." The ICs may further be coupled together such that the two ICs form a multi-camera package that comprises both camera blocks 201 and 251 realized on separate ICs. Alternatively, each IC may be mounted within a larger system such that the optical trains 205 and 255 face different directions, but not necessarily in opposite (i.e., 180 degree angle) directions.

In another embodiment, both camera blocks 201 and 251 may be disposed on a single IC such that the respective optical trains 205 and 255 are designed to focus incident light from different directions onto the respective pixel arrays 211 and 251. In this implementation, all analog and digital signals may be transmitted within the single IC. This is obviously desirable from an implementation and cost perspective, as only a single IC needs to be fabricated for a multi-camera system 200.

In other embodiments, one or both camera blocks 201 and 251 may be disposed on ECBs. Further yet, any combination of ICs and ECBs may be used to realize the multi-camera system 200 of FIG. 2. In any implementation, several other permutations of the multi-camera system 200 may be realized and are typically not dependent upon the nature of how the camera blocks are realized.

In one permutation, the first camera block 201 includes the processing block 230 and may typically be disposed on a single IC. As such, the first camera block 201 realized on a first IC may be designated a master such that the first camera block 201 may function as a stand-alone, system-on-chip (SOC) camera within the confines of a larger system, such as a mobile phone. Similarly, the second camera block 251 may typically be disposed on a separate IC and may be designated a slave in relation to the master on the other IC. With such a relationship in place, the slave IC may be communicatively coupled to the master IC in several manners. One such manner is the use of an I²C communication link to the master which may be realized using two pads on the slave IC. Further, the slave will typically have 4-8 analog output pads for transmitting captured light data to the master as well as a clock and 4 power pads (typically 2 analog and 2 digital). Thus, the slave IC may implemented with a relatively low pad count of about 11 pads. In this manner, all communication from the slave IC is routed through the master IC. This is especially useful for coordinating communications with a host system (described in more detail with regard to FIG. 3 below).

Having a minimal number of pads for implementing the slave IC results in other advantages for the slave IC. Typically the master IC will be capable of running at a faster rate than the slave IC. For example, the master is a 1.3 Mpix sensor that can handle 15 Frames/Second video. Typically it will have a processing path capable of handling data at 19.5 MegaSamples/Second. If the slave IC includes a CIF camera at 0.1 Mpix, the processing path can operate many times faster than what is needed. A user may then slow the clock of the processor 220 when using the slave IC to save power. Another alternative is to use the excess speed of the processor 220 to sample incoming analog signal "N" times. Each sample will have a root kT/C, where k is Boltzman's constant, T is absolute temperature, and C is the sampling capacitor in the PGA 221, uncertainty. By over sampling, the noise/uncertainty is reduced by root ("N").

Thus, the slave IC may be operated at higher rates which results in higher bandwidth and/or sample rate and better noise reduction. Furthermore, with a minimal number of pads to realize the basics of the slave IC, additional pads may be added to yield even higher bandwidth through parallel communications to the master as various embodiments and implementations are contemplated.

In another permutation, each sensor 210 and 250 may be designed differently for different purposes. For example, the first sensor 210 may be a Common Interchange Format (CIF) sensor having a pixel array 211 resolution of 352×288 pixels and typically designed for low resolution video-conferencing. Alternatively, the first sensor 210 may be a Video Graphics Array (VGA) sensor having a pixel array 251 with a resolution of 640×480 and typically designed for slightly higher resolution image-capture. However, the second sensor 250 may be a larger format sensor 250, such as a 1.3 Megapixel or higher resolution sensor, typically used for higher quality image-capture.

In yet another related permutation, the optical trains 205 and 255 of the multi-camera system 200 may be set to have a primary focus range different from each other. For example, the optical train 205 associated with the first camera block 201 that is pointed away from the user may have an adjustable focus range from 3 meters to an infinite range as this camera block 201 is typically used to take pictures or capture video of subjects that may be farther away. Likewise, the optical train 255 associated with the second camera block 251 that is pointed toward the user may have an adjustable focus range for lengths within 1 meter of the camera block 251 as is typically used for video conferencing or taking a picture of the user.

In still another permutation, the camera system may be operated in a manner for capturing image data at the first image-capture device and the second image-capture device simultaneously and then displaying image data from each image capture device on a display simultaneously. This process may typically be referred to as a picture-in-picture display and has advantages of capturing still images while continuously collect and display video.

In other permutations, each set of signals from each camera block 201 and 251 may be processed differently. For example, low-resolution video-conferencing signals may not require pixel correction as may typically be desired for image-capture. Furthermore, each camera block 201 and 251 may be set to different sample rates, different bandwidths, different image-capture parameters, etc.

Figure 3:
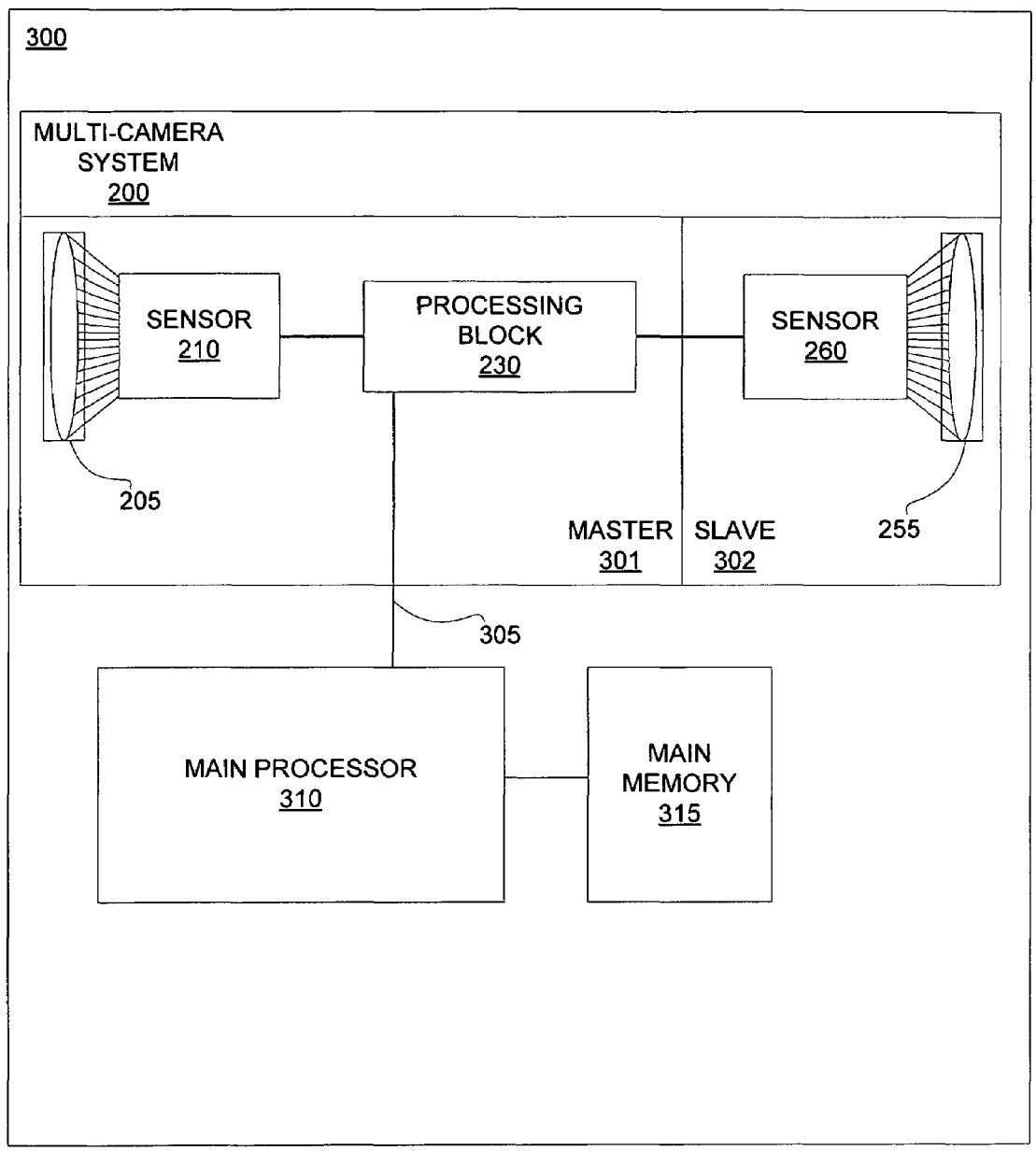
FIG. 3 is a block diagram of a system having the multi-camera system of FIG. 2 disposed therein in accordance with an embodiment of the invention.

FIG. 3 is a block diagram of an electronic device 300 having a multi-camera system 200 of FIG. 2 disposed therein in accordance with an embodiment of the invention. The electronic device 300 is generally representative of an operating environment that may be implemented in any number of electronic systems including handheld devices, digital cameras, digital video cameras, and the like. Although described in previous examples in the context of a digital imaging device, it is appreciated that implementations of the invention may have equal applicability in other areas, such as mobile phones and personal digital assistants (PDAs), laptop computing devices, and the like.

As was described previously with respect to FIG. 2, the multi-camera system 200 may typically include blocks designated as a master 301 and a slave 302 wherein the master 301 includes a first optical train 205, a first sensor 210, and a processing block 230 and the slave 302 includes a second optical train 255 and sensor 260. Together, the master 301 and slave 302 may capture image data that may be processed at the processing block 230 and passed along to a main processor 310 and/or main memory 315 of the electronic device 300.

The electronic device 300 and the multi-camera system 200 may also be arranged with a master/slave relationship. With another master/slave relationship in place, the slave (multi-camera system 200) may be communicatively coupled to the master (electronic device 300) in one of several known manners. One such manner is the use of an I²C communication link 305 to the master similar to that of the one described above with respect to the communications between the camera blocks 201 and 251 of FIG. 2. Furthermore, the communication link 305 may be realized via a flex connection known in the art for coupling SOC sub-components to host electronic devices, such as the electronic device 300. The electronic device typically includes a main processor 310 for controlling any number of sub-components including the multi-camera system 200. The main processor 310 may further be operable to store received image data from the multi-camera system 200 in a main memory 315.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

I claim:

1. A method for capturing image data, the method comprising:
    capturing image data at a first image-capture device via a first optical train focused in a first direction;
    capturing image data at a second image-capture device via a second optical train focused in a second direction;
    transmitting the captured image data from the first and second image-capture devices to a processing block;
    processing the captured image data by the processing block;
    designating the first image-capture device as a master;
    designating the second image-capture device as a slave, communicating among the master, the slave and an externally disposed main processor by way of two signal pads carrying I²C signals among each other, and
    transferring the captured image data to an externally disposed main memory by way of the main processor,
    wherein the master runs at a faster speed than the slave and samples analog signals arriving from the second image-capture device "N" times faster to achieve over sampling of the analog signals and noise reduction by a root "N" factor.

2. The method of claim 1 wherein the processing further comprises processing the captured data from the first image-capture device in a first manner and processing the data captured form the second-image-capture device in a second manner.

3. The method of claim 1, further comprising capturing image data at the first image-capture device and the second image-capture device simultaneously and displaying image data from each image capture device on a display simultaneously.

4. The method of claim 1 wherein capturing image data at the first image-capture device further comprises capturing low-resolution image data and wherein capturing image data at the second image-capture device further comprises capturing high-resolution image data.

5. The method of claim 1, wherein capturing image data via a first optical train focused in a first direction further comprises capturing image data from a direction away from a user and wherein capturing image data via a second optical train focused in a second direction further comprises capturing image data from a direction toward the user.

6. The method of claim 1, further comprising transmitting the captured image data in an analog format and converting the image data to a digital format at the processing block.

* * * * *